Oct. 29, 1968  P. A. BELLIERE  3,407,707
HYDRAULIC MOTOR OF SMALL OVERALL DIMENSIONS FOR DRIVING
ROTATABLY THE LEAD SCREW CONTROLLING THE FEED MOTION
OF A MACHINE CARRIAGE
Filed Feb. 16, 1966  8 Sheets-Sheet 1
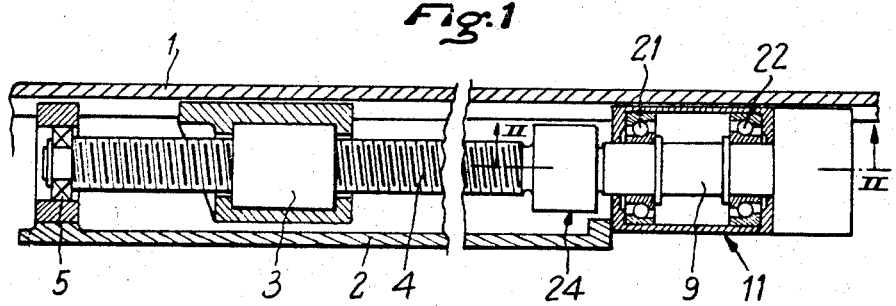
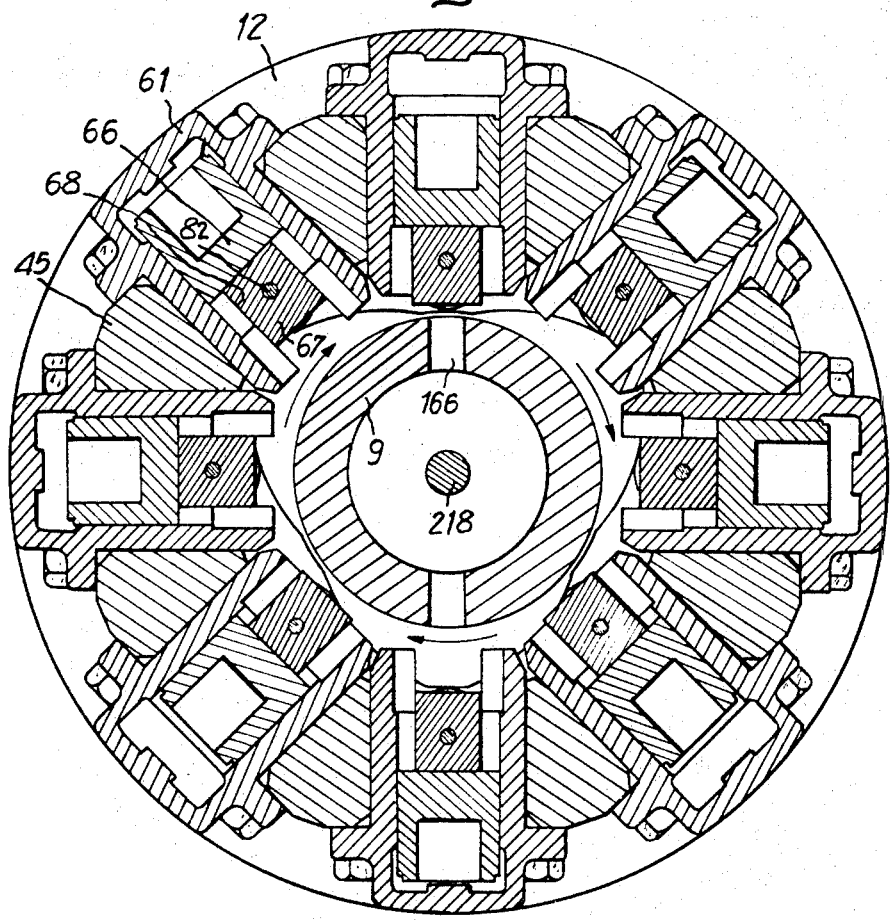

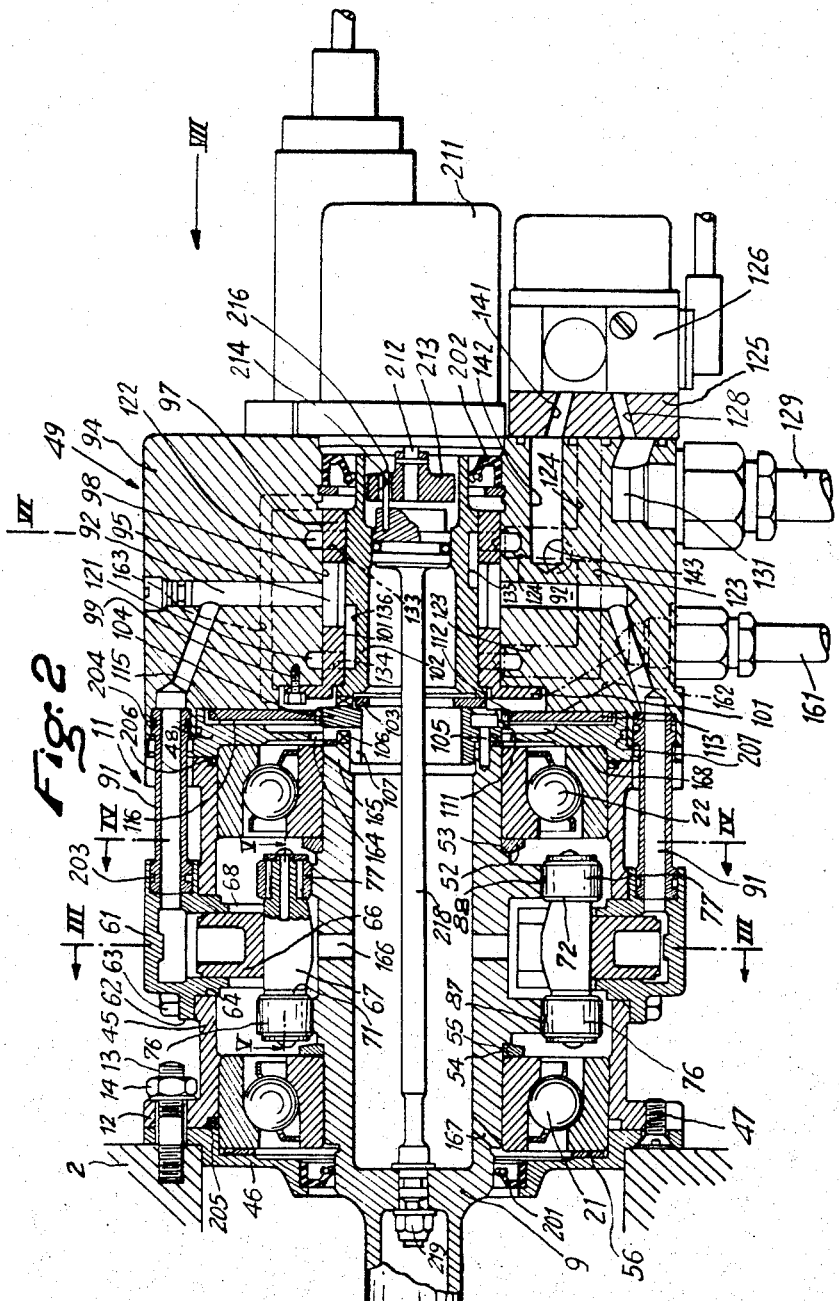

Oct. 29, 1968          P. A. BELLIERE          3,407,707
HYDRAULIC MOTOR OF SMALL OVERALL DIMENSIONS FOR DRIVING
ROTATABLY THE LEAD SCREW CONTROLLING THE FEED MOTION
OF A MACHINE CARRIAGE
Filed Feb. 16, 1966          8 Sheets-Sheet 3
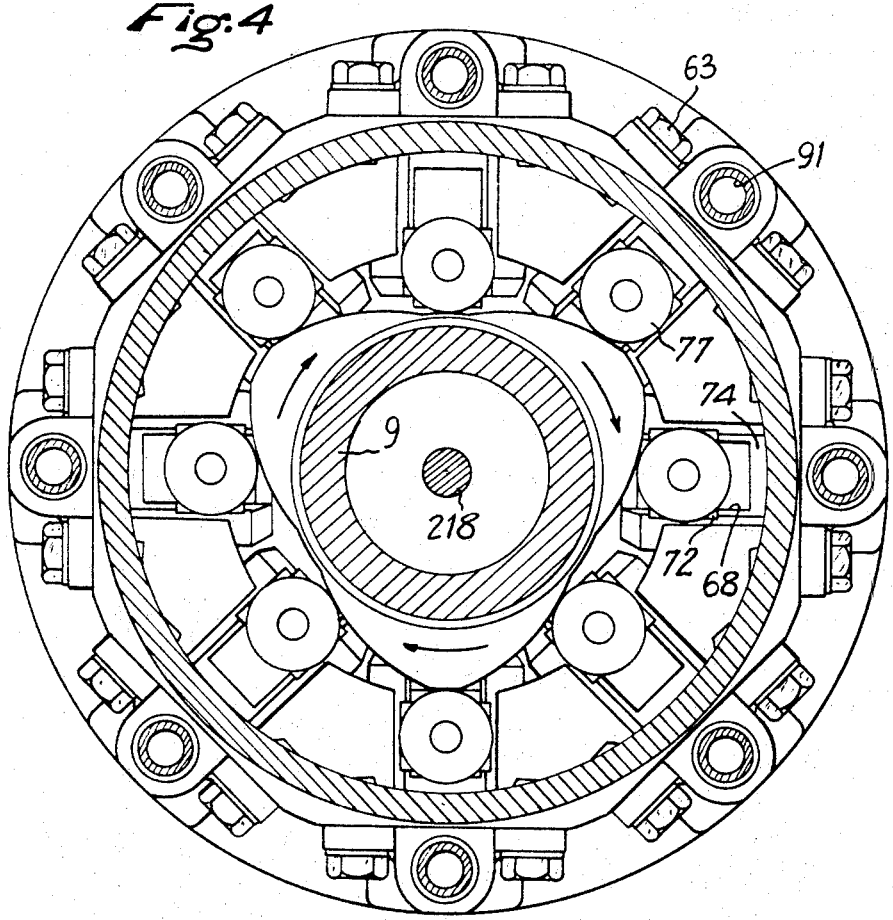
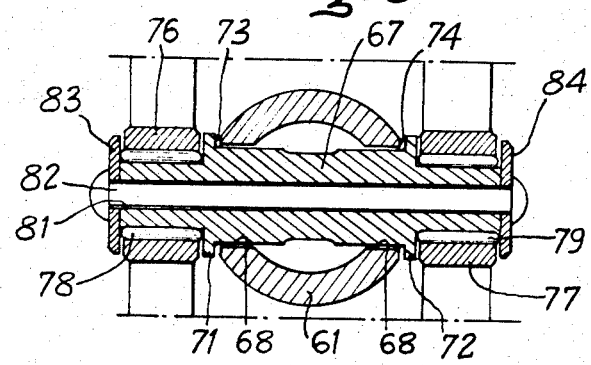

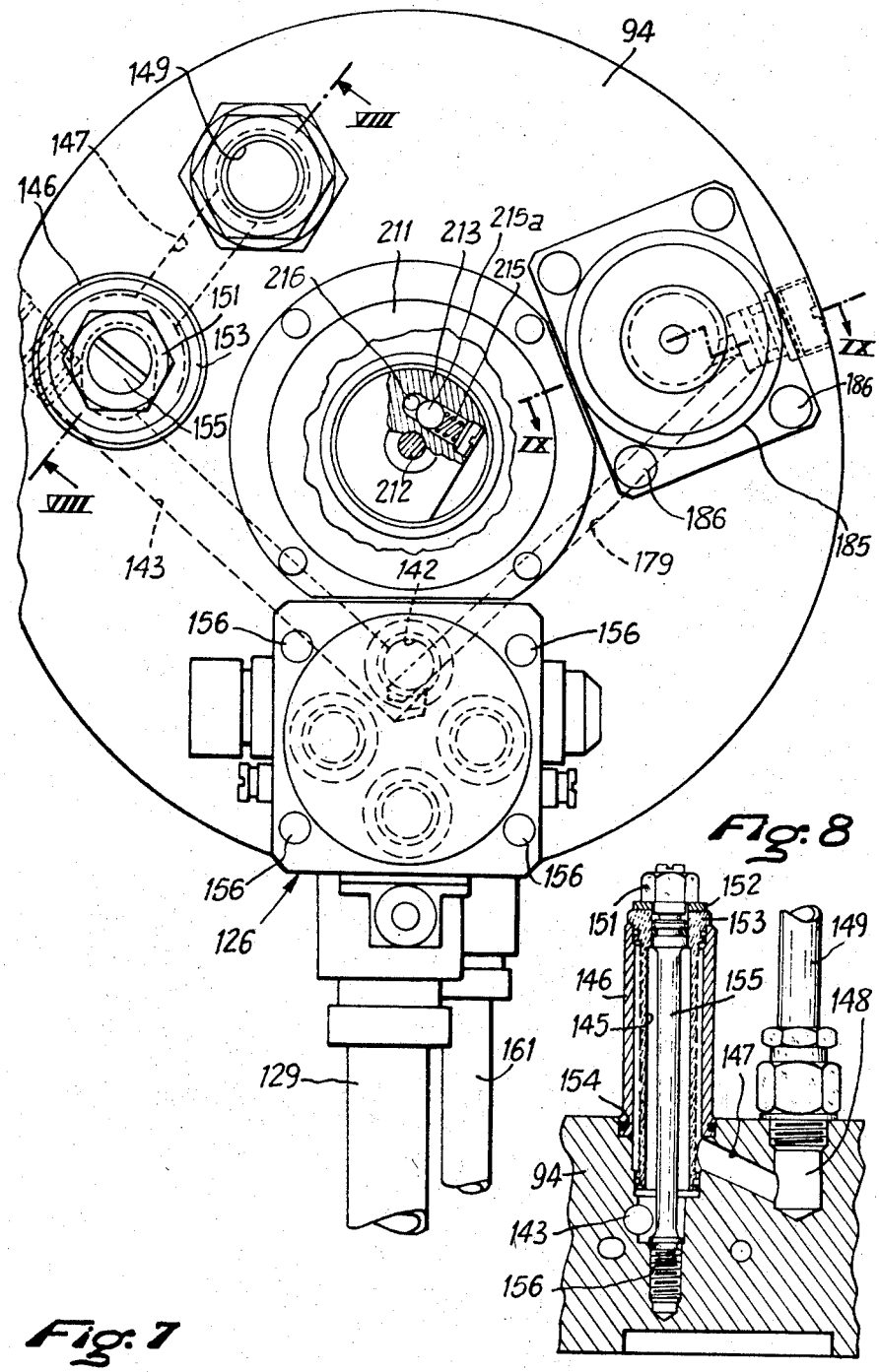

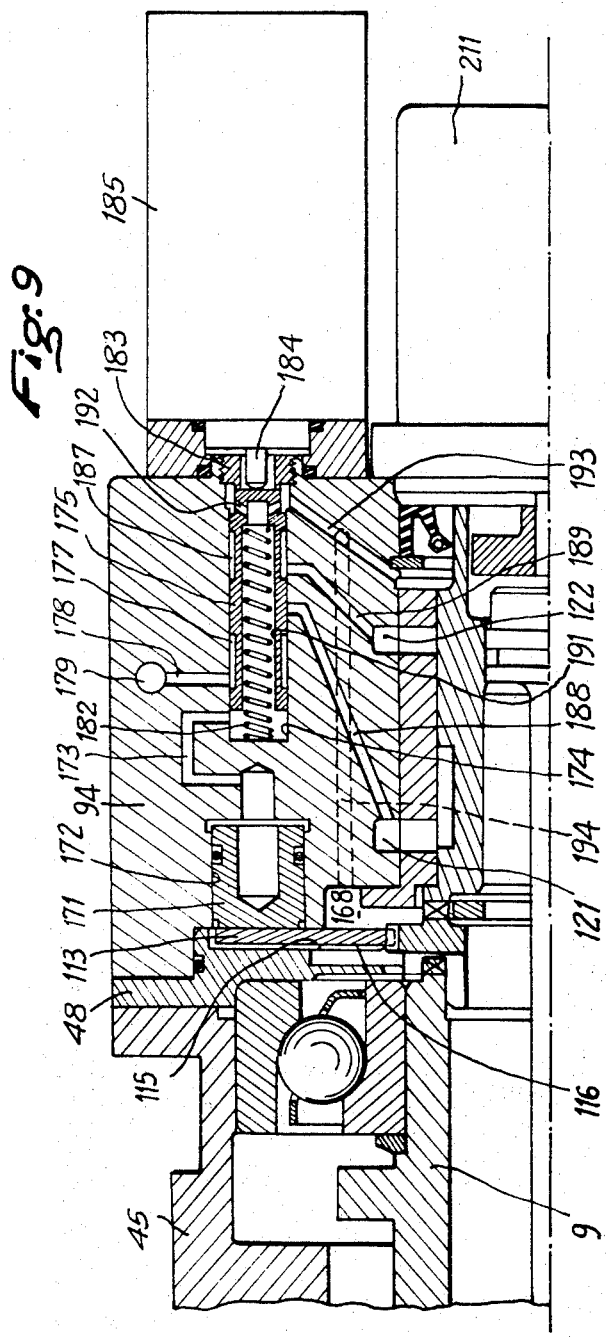

Oct. 29, 1968

P. A. BELLIERE 3,407,707

HYDRAULIC MOTOR OF SMALL OVERALL DIMENSIONS FOR DRIVING
ROTATABLY THE LEAD SCREW CONTROLLING THE FEED MOTION
OF A MACHINE CARRIAGE

Filed Feb. 16, 1966

United States Patent Office

3,407,707
Patented Oct. 29, 1968

3,407,707
HYDRAULIC MOTOR OF SMALL OVERALL DIMENSIONS FOR DRIVING ROTATABLY THE LEAD SCREW CONTROLLING THE FEED MOTION OF A MACHINE CARRIAGE
Pierre Alfred Belliere, Viroflay, France, assignor, by mesne assignments, to Ratier Forest, Paris, France
Filed Feb. 16, 1966, Ser. No. 527,853
Claims priority, application France, July 17, 1965, 25,034
4 Claims. (Cl. 91—29)

ABSTRACT OF THE DISCLOSURE

A hydraulic motor of small overall dimensions for driving rotatably the lead screw controlling the feed motion of a machine carriage in which a plurality of cylinders is secured to the stator with their axes arranged radially in a common plane and a cross member is secured to each piston reciprocable in the cylinder in a direction parallel with the axis of the rotor. A rotatable means is mounted on each end of the cross members, two cams are affixed to the rotor on either side of the common plane and spaced axially by a distance equal to the distance between the rotatable means and the cams are in engagement with the corresponding rotatable means.

---

This invention relates to a hydraulic motor of improved design which is suitable especially for the purpose of driving in rotation the lead-screw which controls the feed motion of the carriage of a machine such as a machine-tool.

The object of the invention is to provide a hydraulic motor which is particularly well suited to this type of work while being of very small overall size both in diameter and in length.

With this object in view, according to a first characteristic feature of the invention, a hydraulic motor having a rotor is provided with cams which are acted upon by rollers carried by pistons slidably mounted within radial cylinders, with each piston being applied against the central portion of a cross-member, the two ends of which are each designed to carry a roller which is in contact with a corresponding cam rigidly fixed to the rotor of said motor.

The arrangement outlined above makes it possible to reduce the radial dimensions of the motor for two reasons. Firstly by virtue of the fact that the rollers are romoved to the exterior of the piston instead of being housed within this latter as in the conventional arrangement and secondly by reason of the fact that the presence of two rollers per piston makes it possible to reduce the diameter of each roller, inasmuch as the stress to which each roller is subjected is equal to one-half the stress which would be exerted on a single roller.

Again with a view to reducing the overall size of the assembly when it proves necessary to make use of a brake in order to provide positive locking of the lead-screw against rotation, the conventional expedient which consists in adding a braking system to the motor or to the lead-screw is eliminated. Accordingly, another characteristic feature of this invention consists in providing the hydraulic motor with a built-in-brake unit consisting of a disc which is mounted on the rotor by means of longitudinal sliding splines for coupling in rotation, said disc being forcibly applied when necessary against a stationary face of the motor casing under the action of a hydraulic system comprising one or a number of axially-acting piston and cylinder devices to which oil is admitted under pressure under the control of a brake-operating member.

The feature which consists in endowing the hydraulic motor with a built-in braking system makes it possible to provide a control unit which is less cumbersome than the added-brake systems.

In one particular embodiment, the brake-operating member which initiates the admission of oil under pressure into the hydraulic piston and cylinder devices for clamping the brake disc is designated and arranged so that the pipes for admitting oil into the cylinders of the hydraulic motor and discharging oil therefrom are placed into communication at the same time. By virtue of this characteristic feature, the motor can no longer have a tendency to be driven in rotation either in one direction or in the other under the action of any leakage of oil under pressure which may occur. It is thus possible to reduce the power to be applied to the barke, especially if the reactions exerted on the lead-screw in the circumferential direction are of a low-order.

Again with a view to providing an assembly which is as compact as possible, a system for driving a pulse detector of any suitable type is mounted on the end of the rotor opposite to that end which is coupled with the lead-screw.

According to another characteristic feature of the invention, the system for controlling the admission of oil under pressure to the motor comprises a single servo-valve connected to the distributor which is incorporated in the motor by means of conduits of relatively small section fitted with a two-position selecting slide-valve designed to effect, in a first position, the supply of oil to the motor at a low rate of flow and directly through the servo-valve and, in a second position, the opening of a hydraulic relay-valve connected to the source of oil under pressure and to the motor distributor by means of conduits of larger section so as to effect the supply of oil to the motor at a high rate of flow in order to endow this latter with a high rotational velocity.

An installation of this type makes it possible to control the operation of the motor with a high degree of precision, which is of particular interest in copying work, and also makes it possible to supply the motor at a high rate of flow so as to produce a higher speed of rotation simply by virtue of the presence of the selecting slide-valve and the hydraulic relay-valve which is controlled by the same servo-valve. This feature permits of standardization of installations inasmuch as the entire servo-control system remains the same and it is merely necessary, when so required, to interpose the selecting slide-valve and hydraulic relay-valve between the servo-valve and the motor.

In a particular form of construction, the hydraulic relay-valve comprises two slide-valves each having one end face which is subjected to the pressure prevailing respectively at the outlets of the two servo-valve branch pipes while the other end face is located within a chamber which is connected to the same branch pipe but downstream of the selecting slide-valve, each of said slide-valves of the relay-valve being urged elastically by two oppositely-acting springs towards a neutral mid-position in which no communication is afforded and each slide-valve being capable of connecting the corresponding pipe of the motor, either to the source of oil under pressure or to the collector-tank, depending on whether said slide-valve is forced back by the pressure of oil delivered by the servo-valve or by the return oil which is discharged by the motor.

The invention will be more readily understood from a perusal of the following description and by consideration of the accompanying drawings which show by way of a nonlimitative example one embodiment of a lead-screw system for controlling the feed motion of a machine-tool carriage comprising a hydraulic motor in accordance with the invention.

In these drawings:

FIG. 1 is a diagrammatic view partly in elevation and partly in section of the complete device.

FIG. 2 is a view taken along the line II—II of FIG. 1, the view looking in the direction of the arrows.

FIGS. 3 and 4 are views taken along the lines III—III and IV—IV respectively of FIG. 2, the view looking in the direction of the arrows.

FIG. 5 is a view taken along the line V—V of FIG. 2, the view looking in the direction of the arrows.

FIG. 7 is a view looking in the direction of the arrow VII of FIG. 2.

FIG. 8 is a view taken along the line VIII—VIII of FIG. 7, the view looking in the direction of the arrows.

FIG. 9 is a view taken along the line IX—IX of FIG. 7, the view looking in the direction of the arrows.

Figure 6:
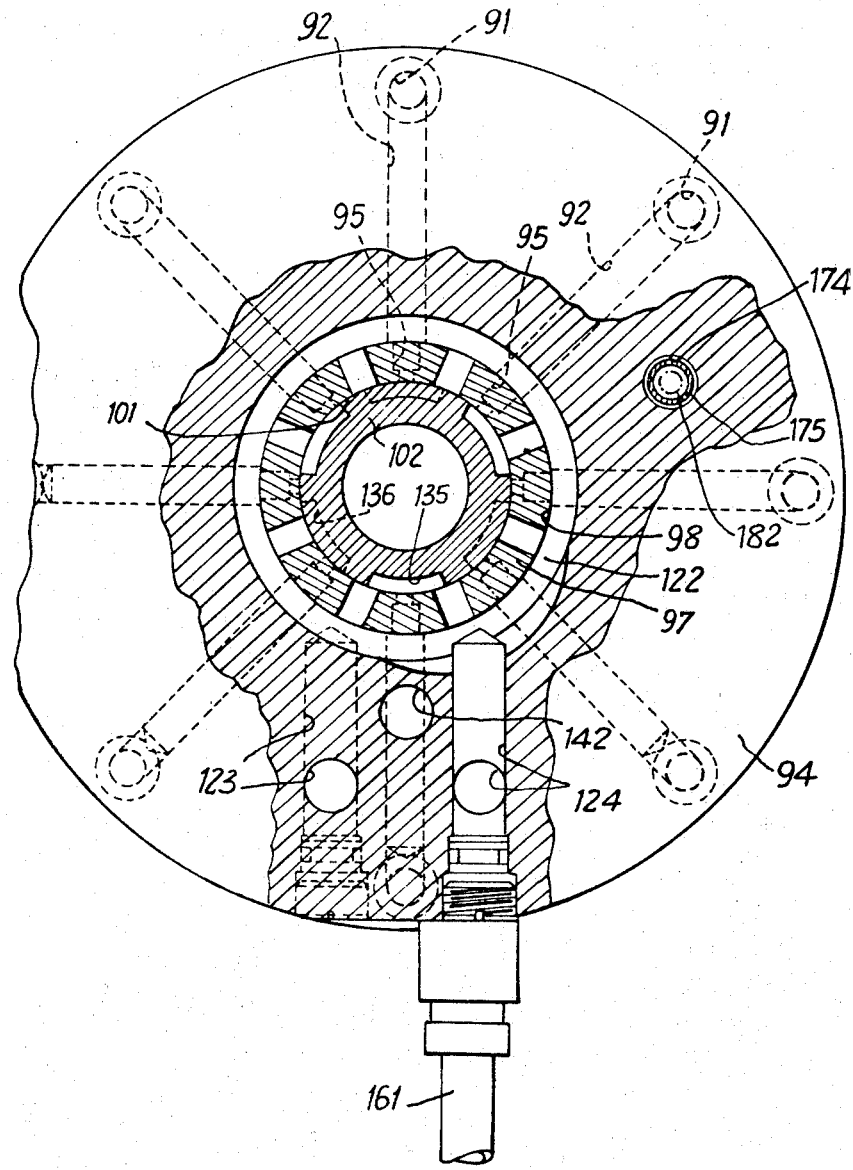
FIG. 6 is a view taken along the line VI—VI of FIG. 2.

The device for controlling the feed motion of a machine-tool carriage 1 comprises a nut 3 which is secured to the carriage 1 and in which is engaged a lead-screw 4, one end of which is rotatably mounted in a bearing 5. The other end of the lead-screw is secured by means of a rigid coupling unit 24 to the driving end of a rotor 9 of a hydraulic motor which is generally designated by the reference numeral 11 and secured to frame 2 of the machine by means of a flange 12 (see also FIG. 2) of the motor casing, for example by means of threaded studs such as stud 13 and by means of nuts 14.

The hydraulic motor 11 is essentially constituted by a cylindrical casing 45, an end-cover 46 which is secured to said casing by means of countersunk-head screws 47, an end-shield 48, and a hydraulic unit 49 which is secured to the casing 45 by means of screws (not shown). The outer race of a ball-bearing 22 is applied directly against the inner face of the end-shield 48 and its inner race is applied against a ring 52 of hardened steel which is in turn applied against an annular shoulder 53 of the rotor 9 of the motor. Similarly, the inner race of another ball-bearing 21 is applied against a steel ring 54 which is in turn applied against an annular shoulder 55 of the rotor 9 while the outer race thereof bears against an adjusting washer 56 having a suitable calibrated thickness which is in contact with the inner face of the end-cover 46.

Cylinders 61 (see also FIGS. 3 and 4), which are eight in number in the embodiment shown, are secured by means of flanges 62 and screws 63 within radial bores 64 of the motor casing 45.

A piston 66 is slidably mounted in each cylinder 61 and the flat end-face of each piston is applied directly against a cross-member 67 which is slidably mounted in a diametrical slot 68 of the cylinder (as also shown in FIG. 5). Each cross-member 67 is provided with two annular flanges 71, 72 which are adapted to slide against two flat portions 73, 74 formed on the external cylindrical surfaces of the cylinders 61, thereby ensuring the axial position-setting of the cross-members while enabling these latter to slide with the piston in a direction parallel to the axis of the cylinder.

Two rollers 76, 77 are mounted on the ends of each cross-member 67 by means of two needle-bearings 78, 79 respectively. There is fitted in an axial bore 81 of each cross-member a cylindrical rod 82, the two riveted ends of which retain two washers 83, 84 for holding the rollers and their needle-bearings in position.

The rollers 76, 77 which are mounted on each cross-member 67 cooperate respectively with two identical cams 87, 88 which are rigidly fixed to the rotor 9 and each comprises three lobes in such manner as to ensure that, at each moment, the sum of the volumes of fluid admitted into some cylinders is equal to the sum of volumes of fluid which is discharged from the other cylinders.

The bottom of each cylinder 61 is connected by means of a tube 91 (as shown in FIGS. 2 and 6), and by means o fan elbowed duct 92 formed in a radial plane within body 94 of the hydraulic unit 49, to a corresponding port 95 formed in a bushing 97 which is fitted within a bore 98 of the body 94 and made integral therewith by means of screws 99 which traverse an annular flange 100 of said bushing.

A rotary distributor 102 is made integral with the rotor 9 of the motor by means of an Oldham coupling is mounted for rotation within a bore 101 of the bushing 97. One portion of said Oldham coupling is cut in the corresponding extremity of the distributor 102 and the other portion, as constituted by a coupling member 104 which is joined to said distributor by means of an intermediate ring 103, is secured to the rotor 9 by means of screws such as the screw 105 and keys such as key 106. Said keys are constituted, for example, by teeth which are identical with those of the above-mentioned Oldham coupling and which engage in keyways 107 formed in said coupling member 104.

The periphery of the coupling member 104 is provided with splines 111 over which are engaged corresponding grooves 112 of the brake disc 113 which is capable of sliding axially over said coupling member without rotating relatively to the latter, said brake disc being disposed between two opposite plane faces 115, 116 of the end-shield 48 and body 94 of the hydraulic unit. The operation of the brake disc 113 will be explained in detail hereinafter.

One each side of the transverse plane which contains the radial portions of the ducts 92 which are formed in the body 94 of the hydraulic unit, there are formed two annular grooves 121, 122 which communicate respectively with two ducts 123, 124 (as shown in FIGS. 2 and 6), with said ducts being also intended to communicate, by way of ducts (not shown) which are formed in a plate 125, with two corresponding ports of a servo-valve 26 which is additionally provided on the one hand with a port (not shown) for the return of oil to the collector-tank by way of a duct 128 formed through the plate 125 and a pipe 129 which is secured to the body 94 of the hydraulic unit opposite an opening 131 which communicates with the duct 128 and, on the other hand, with an aperture which is connected to the source of oil under pressure and which will be referred to again hereinafter.

The stationary bushing 97 is pierced at the level of the annular groove 122 with eight apertures 133 (as shown in FIGS. 2 and 6) and, opposite the annular groove 121, with eight apertures 134. The rotary distributor 102 is provided with three peripheral recesses 135 which are capable of establishing a communication between the ports 95 and the apertures 133, and with three further peripheral recesses 136 which are capable of establishing a communication between the same ports 95 and the apertures 134.

The oil under pressure is supplied to the servo-valve 126 along the following path: a duct 141 (as shown in FIG. 2) which is formed in the plate 125, an axial duct 142 (as shown in FIGS. 2, 6 and 7) which communicates with a duct 153, with said ducts being formed in the body 94 of the hydraulic unit, the interior of a tubular filter 145 (as shown in FIG. 8), flowing through the wall of said filter, the interior of a cylindrical shell 146, a duct 147 which communicates with said cylindrical shell and with another duct 148, and finally a pipe 149 through which oil under pressure is supplied from any suitable source.

The filter 145 and the cylindrical shell 146 are held in position by a nut 151 mounted on the threaded outer end of a small column 155, the inner end of which is forcibly screwed into a tapped bore 156 of the body 94.

Said nut 151 is applied against the outer end of the cylindrical shell 146 through the intermediary of a washer 152 and an annular flange 153 which terminates the outer end of the filter 145. The inner end of cylindrical shell is retained within a recess 154 of the body 94.

In FIG. 7, the reference numeral 156 designates the screws which serve to secure the servo-valve 126 and the plate 125 to the body 94.

For the return of leakages of fluid from the device as a whole, provision is made for a pipe 161 (as shown in FIG. 2) which is connected to a duct 162 of the body 94 of the hydraulic unit. Said duct opens into a chamber 168 in which the braking disc 113 is located. With the same object in view, provision is also made for a duct 163 formed within said body so as to by-pass the two ends of the rotary distributor 102 externally of the latter, an aperture 164 which is formed in the end-shield 48 and ducts 165, 166, 167 which are formed in the rotor 9.

The brake disc 113 is intended to be applied against the flat face 115 of the motor end-shield 48 under the action of one or a number of uniformly spaced pistons such as piston 171 (shown in FIG. 9) which are slidably fitted within a bore 172 formed axially within the body 94 of the hydraulic unit. Said bore forms a jack cylinder and the bottom of the latter communicates by way of a duct 173 with the end of a bore 174 in which is mounted a slide-valve 175 for actuating the brake. The admission of oil under pressure is effected by way of an annular groove 177, a duct 178 and another duct 179 communicating with the duct 142 (shown in FIGS. 2 and 7) which is permanently connected to the source of oil under pressure.

The slide-valve 175 is urged elastically towards its position of closure by a spring 182 against a fixed stop 183 for the purpose of actuating the brake. The slide-valve is thrust back in the opposite direction by push-rod 184 of an eletcromagnetic device 185 which is secured by means of screws 186 (as shown in FIG. 7) to the end of the body 94 of the hydraulic unit.

An additional annular groove 187 (shown in FIG. 9) of the slide valve 175 serves, during the operation of the brake, to establish a communication between the two annular grooves 121, 122 of the main hydraulic system of the motor by way of ducts 188, 189.

The return of oil from the brake-operating jack 171 takes place through an axial passage 191 of the slide-valve, ports 192 of the latter, a duct 193 and a duct 194 up to the chamber 168 in which the brake disc 113 is located, and then from said chamber through the duct 162 into the pipe 161 for the return of leakages.

As will be understood, the entire installation is provided with suitable seals and, in particular two seals 201, 202 at the two ends of the rotor 9, seals 203, 204, at the two ends of the pipes 91 which provide connections to the cylinders, seals 205 and 206 between the motor casing 45 and, on the one hand, the cover 46 and, on the other hand, the end-shield 48, a seal 207 within the recess provided for the engagement of the end-shield 48 within the body 94 of the hydraulic unit, and so forth.

The motor is provided with a pulse detector 211 of any suitable conventional type which is designed for the automatic control of the movement of rotation of the lead-screw, especially for the purpose of carrying out copying operations. Said pulse detector comprises a driving shaft 212 on which is keyed a plate 213 (as shown in FIGS. 2 and 7), there being formed in said plate a slot 214 into which a pin 216 is thrust by a spring 215 and a ball 215a. Said pin is fixed in an eccentric position in one end of a rod 218 which is centered in the rotary distributor 102; the other end of said rod has a annular shoulder and a terminal screw-thread on which is screwed a nut 219 so that said rod may thus be rigidly fixed in position. By virtue of this special mode of assembly, the driving pin 216 of the pulse detector is made fast with the rotor 9 of the motor and is therefore not liable to be influenced by any play which may develop in the coupling between said rotor and the rotary distributor 102, as would be the case if said driving pin had been fixed directly within the distributor.

Figure 10:
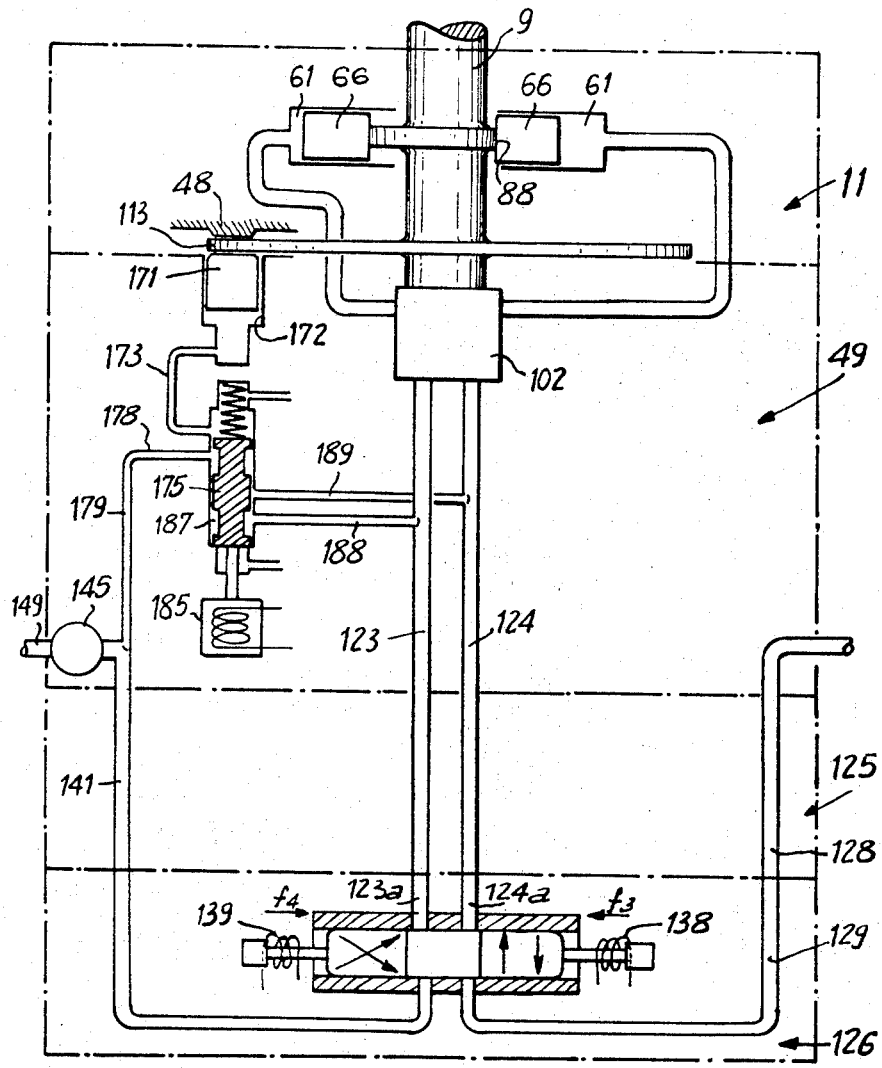
FIG. 10 is a diagrammatic view of the hydraulic circuit of the device of FIGS. 1 to 9.

FIG. 10 is a diagrammatic view of the complete installation. In this view, the same members as those which have been described earlier are designated by the same reference numerals as those indicated in the other figures.

In this view, the servo-valve 126 is represented in a highly simplified form in order that a clearer understanding of its operation may thus be gained. As will be apparent, the view in fact represents a more complicated system which is designed to regulate the rate of flow of the fluid in addition to the direction of flow, in response to an electrical excitation as provided, for example, by a copying feeler which scans a template.

The operation is as follows:

The oil under pressure which is admitted through the pipe 149, the filter 145 and the duct 141 reaches the servo-valve 126. Since said servo-valve is normally closed as shown in FIG. 10, the oil is not admitted into the cylinders and cannot pass out of the latter, with the result that the motor is stopped. If the coil 138 of the servo-valve 126 is energized, its slide-valve will move in the direction of the arrow $f3$ in which the oil under pressure is admitted from the duct 141 to the ducts 123a and 123 which supply the cylinders 61 of the motor in one direction of rotation of the latter, and flows through the annular groove 121, the radial apertures 134, the recesses 136 of the distributor, the ducts 92 and the pipes 91, whereas the oil contained in the cylinders whose pistons are thrust back returns to the collector-tank via the ducts 91, 92, the recesses 135, the annular groove 122, the duct 124, the duct 124a, the servo-valve 126 and the pipe 129.

If the other coil 139 of the servo-valve 126 is energized, the slide-valve of said servo-valve moves in the direction of the arrow $f4$ and the oil circulates in the opposite direction. In other words, the oil under pressure which is admitted into the duct 143 flows through the servo-valve and is discharged from the latter through the duct 124a which is connected to the duct 124, then follows the path described above in the opposite direction, returns to the collector tank via the ducts 123, 123a, the servo-valve 126 and the pipe 129, in which case the motor rotates in the opposite direction.

Should it prove necessary to effect the positive locking of the rotor of the motor, the brake thereof is accordingly actuated. For this purpose, the coil of the electromagnet 185 is energized, and the electromagnet thrusts back the slide-valve 175 in such a manner as to put the ducts 179 and 178 for supplying oil under pressure into communication with the duct 173 for supplying oil to the brake-operating jacks 172. The pistons 171 thrust back the disc 113 against the motor end-shield 48, thereby positively locking the rotor 9. At the same time, the annular chamber 187 of the slide-valve 175 has connected as a by-pass the two ducts 189, 188 which are connected respectively to the ducts 123, 124 for the main circulation of oil within the motor, with the result that the pistons which drive the motor are no longer liable to drive the rotor either in one direction or in the other.

Figure 11:
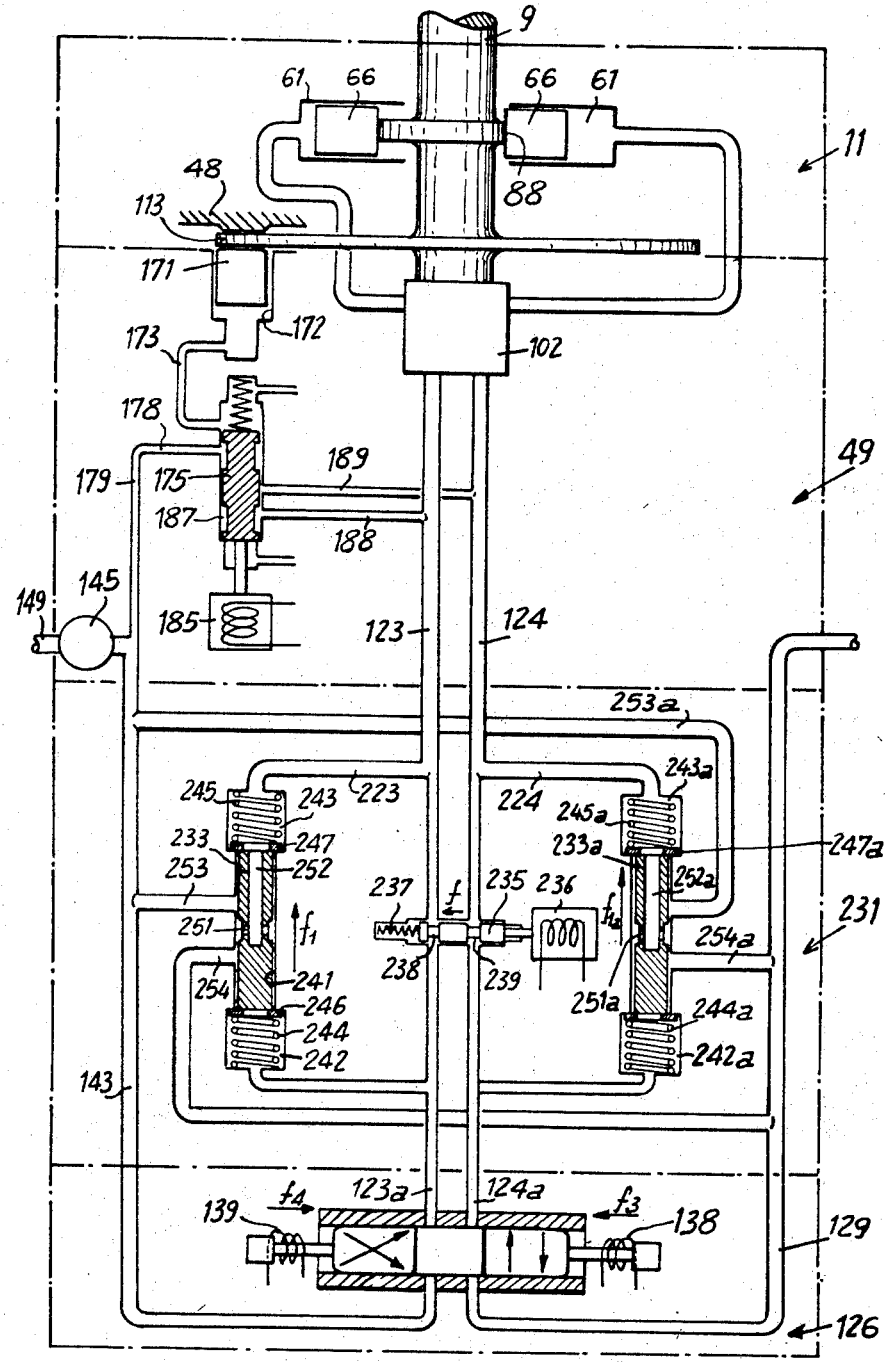
FIG. 11 is a diagrammatic view of an alternative form of the invention provided with a servo-valve for rotating the motor at high speed.

FIG. 11 is a diagrammatic view of an alternative form which differs from the form of embodiment shown in FIG. 10 in that the servo-valve 126 does not produce the opening and closure of the oil supply and return circuit directly, but through the intermediary of a hydraulic relay-valve system which is generally designated by the reference numeral 231. Said hydraulic relay-valve system is interposed between the servo-valve 126 and the body 94 of the hydraulic unit 49 instead of the plate 125, and essentially comprises two relay slide-valves 233, 233a and a control slide-valve 235.

The control slide-valve 235 is actuated by an electromagnet 236 which is capable of moving said slide-valve in the direction of the arrow $f$ in opposition to the force exertd by a restoring spring 237. The slide-valve 235 is provided with two grooves 238, 239 which, in the rest position of said slide-valve as shown in FIG. 11, provides a direct communication between the outlet ducts 123a, 124a of the servo-valve 126 and the ducts 123, 124 for supplying oil to the motor and returning said oil. When the electromagnet 236 is energized, the slide-valve 235 is caused to move in the direction of the arrow f and interrupts this communication.

The two relay slide-valve 233, 233a are similar to each other. The slide-valve 233, for example, is adapted to slide within a cylinder 241, the two ends of which open respectively into two chambers 242, 243 and the latter communicate respectively with the outlet duct 123a of th servo-valve 126 and with the duct 123 which provides a connection with the cylinders of the motor. Said slide-valve 233 is maintained elastically in the neutral mid-position thereof, as shown in the drawings, by means of a system comprising two restoring springs 244, 245 which are applied at one end respectively against the ends of the chambers 242, 243 and at the other end against washers 246, 247. Said washers are placed astride and rest on the opposite annular end of the corresponding chamber and on the corresponding end of slide-valve 233.

The slide-valve 233 is provided with an annular groove 251 which communicates permanently with the chamber 243 via an axial passageway 252. A duct 253 which is permanently connected to the duct 143 for the supply of oil under pressure and a duct 254 which is permanently connected to the pipe 129 for the return of oil to the collector-tank open into the cylinder of the slide-valve 233 on each side of the annular groove 251 of the latter when said slide-valve is in the neutral mid-position thereof. When the slide-valve 233 is displaced in the direction of the arrow f1, a communication is accordingly established betwen the duct 253 for the supply of oil under pressure and the chamber 243. When said slide-valve is displaced from the neutral mid-position thereof in the direction opposite to that of the arrow f1, said slide-valve accordingly establishes a communication between the chamber 243 and the oil return duct 254.

The constructional design of the other relay slide-valve 233a is the same as that of the slide-valve 233 and will therefore not be described in detail; corresponding elements are designated in the drawing by the same reference numerals to which are assigned the index a.

The cross-sectional areas of the ducts 233, 224 for the supply of oil to and return from the motor as considered throughout the relay-valve system 231 is larger than the cross-sectional areas of the ducts 123a, 124a which are connected to the servo-valve 126. This is due to the fact that the rate of flow through the relay-valve system is higher than in the servo-valve system, and the object of the relay-avlve is to permit high-speed operation of the hydraulic motor by employing the same servo-valve both for the control of said relay-valve and for the low-speed control which is effected directly from said servo-valve without making use of the relay-valve.

The operation of the installation of FIG. 11 is as follows:

When it is desired to operate the hydraulic motor 11 at low speed under the direct and high-precision control of the servo-valve 126, the electromagnet 236 of the control slide-valve 235 is not energized, with the result that said control slide-valve occupies the position shown in the drawings and that the ducts 123a and 124a of the servo-valve are connected directly to the corresponding ducts 123, 124 which are connected to the motor. Under these conditions, according as either one or the other of the two windings 138, 139 of the servo-valve 126 is energized, the motor is caused to rotate either in one direction or the other as described earlier in reference to FIG. 10. Under these conditions, the relay valve system 231 does not come into operation since the two ends of the relay slide-valve 233 are subjected to the same pressure, namely the pressure which prevails within the ducts 123a and 123. Similarly, the other relay slide-valve 233a also remains in equilibrium in the neutral mid-position thereof under the action of the equal pressures which prevail at both ends, with said ends being subjected to the same pressure as that which is maintained within the ducts 124a and 124.

Should it prove desirable to operate the motor at high speed, it is in that case merely necessary to energize the electromagnet 236 of the control slide-valve 235, with the result thereby achieved being to suppress any direct communication between the duct 123a and the duct 123 as well as any direct communication between the duct 124a and the duct 124. Assuming, for example, that the coil 138 of the servo-valve 126 is energized, the slide-valve of said servo-valve accordingly moves in the direction of the arrow f3, and the oil under pressure which is derived from the supply duct 143 flows through the slide-valve unit of the servo-valve 126, penetrates into the duct 123a and reaches the relay-valve chamber 242. The relay slide-valve 233 is therefore thrust back in the direction of the arrow f1 and the duct 253 which conveys oil under pressure is put into communication with the ducts 223 and 123 for the supply of oil to the motor by way of the annular groove 251 and the axial passageway 252 of said slide-valve, with the result that the oil under pressure is admitted into the cylinders of the motor by means of its rotary distributor 102 under the conditions which cause the rotor to rotate in a certain direction. It will be noted that the slide-valve 233 remains in its position of supply to the duct 123 by reason of the fact that, in spite of the action of the spring 245, the end of said slide-valve which is located within the chamber 243 is subjected to a pressure which is slightly lower than the pressure exerted on the other end of said slide-valve within the chamber 242, which is due to te pressure drop which occurs within the duct 123 upstream of the motor as a result of the operation of the latter. The oil which is discharged by the motor into the duct 124 exerts pressure, within the chamber 243a, on the relay slide-valve 233a and thrusts back the latter in the direction opposite to that of the arrow f1a since the chamber 242a is connected to the collector-tank via the pipe 129 and the slide-valve unit of the servo-valve 126, with the result that said chamber is thus at atmospheric pressure. The duct 124 for the return of oil from the motor is therefore connected to the collector-tank by the slide-valve 233a via the chamber 243a, the axial passageway 252a, the annular groove 251a and the return duct 254a. The relay slide-valve 233a remains in this position since the pressure of the oil which is discharged from the motor, even when of low valve, is nevertheless higher than atmospheric pressure. As a consequence, the chamber 243a is subjected to a pressure which is slightly higher than that which prevails within the chamber 242a; and the difference in these pressures gives rise to a resultant force which is higher than the force exerted by the spring 244a.

Should it be desired to cause the motor to rotate in the opposite direction, it is merely necessary to energize the other coil 139 of the servo-valve 126, the slid-valve of which accordingly moves in the direction of the arrow f4, the oil under pressure reaches the duct 124a and consequently initiates the displacement of the relay slide-valve 233a in the direction of the arrow f1a while the other relay slide-valve 233 moves in the direction opposite to that of the arrow f1 and the direction of circulation of the oil is therefore reversed.

As will be readily apparent, the invention is not limited to the embodiments which have been described and illustrated and which have been given solely by way of examples and a large number of modifications can be made therein, depending on the applications which are contemplated, without thereby departing either from the scope or the spirit of the invention.

What is claimed is:

1. A hydraulic motor having a stator, a rotor, a plurality of cylinders secured to said stator and having their axes arranged radially in a common plane, a piston mounted in each cylinder for reciprocating sliding movement therein, a cross-member secured to the inner end of each piston in a direction parallel with the axis of said rotor, a roller mounted for rotation on each end of each said cross-members, and two cams secured to said rotor on either side of said common plane and spaced axially by a distance equal to the distance between the two rollers carried by each cross-member, said cam being in engagement with the corresponding rollers.

2. A hydraulic motor having a stator, a rotor, and a built-in braking device, said braking device comprising a disc splined on said rotor and facing a transverse face of said stator, at least one piston and cylinder unit mounted in said stator in a direction parallel to the axis of said rotor, a braking device controlling member adapted to control said piston and cylinder unit for supplying same with pressure fluid, power piston and cylinder devices adapted to rotate said rotor in said stator, an inlet and an outlet adapted to connect said power piston and cylinder devices to a source of pressure fluid and to a zone of lower pressure, respectively, and said braking device controlling member being adapted to establish a communication between said inlet and outlet upon leading fluid pressure to said piston and cylinder unit of said braking device.

3. A control system for a hydraulic motor, comprising a source of pressure fluid, a single servo-valve permanently connected to said source of pressure fluid and to a zone of lower pressure as well as to said hydraulic motor through pipes of relatively small cross-section, a control valve on said pipes from said servo-valve to said motor adapted in open position of said servo-valve and of said control valve to provide for circulating pressure fluid with a small output from said source to said zone of lower pressure through said motor to rotate said motor at slow speed, and relay-valves permanently connected to said source of pressure fluid and to a zone of lower pressure as well as to said motor through inlet and outlet pipes of relatively large section, said relay-valves being further connected to said pipes from said servo-valve to said motor between said servo-valve and said control valve to provide for circulating pressure fluid with a large output from said source to said zone of lower pressure through said motor for rotating said motor at high speed upon said servo-valve being in open position and said control valve in closed position.

4. The control system according to claim 3, wherein said relay-valves comprise a pair of sliding valves having one end face subjected respectively to the pressures prevailing in said pipes between said servo-valve and said control valve and the other end face thereof subjected respectively to the pressures prevailing in said inlet and outlet pipes, said sliding valves being resiliently urged toward middle neutral position in which they effect no communication and being capable of connecting said inlet and outlet pipes of relatively large section either to said source of pressure fluid or to said zone of lower pressures as they are either pushed by the pressure fluid from said servo-valve or pushed by the fluid leaving the motor.

References Cited
UNITED STATES PATENTS

| | | | |
|---|---|---|---|
| 2,657,772 | 11/1953 | Chamberlain | 188—73 |
| 2,937,722 | 5/1960 | Ruet | 188—73 |
| 2,989,153 | 6/1961 | Boulet | 188—73 |
| 717,445 | 12/1902 | Nestius | 92—72 |
| 1,790,797 | 2/1931 | Dameroll | 91—28 |
| 2,718,879 | 9/1955 | Rice et al. | 92—72 |
| 2,847,984 | 8/1958 | Gallant | 91—29 |
| 2,966,245 | 12/1960 | Judge | 192—18 |
| 3,280,703 | 10/1966 | Humphrey | 92—72 |

PAUL E. MASLOUSKY, *Primary Examiner.*